United States Patent
Riedel et al.

(10) Patent No.: US 12,552,256 B2
(45) Date of Patent: Feb. 17, 2026

(54) ELECTRIC AXLE DRIVE TRAIN, CONTROL UNIT, AND COMPUTER PROGRAMME PRODUCT

(71) Applicant: Schaeffler Technologies AG & Co. KG, Herzogenaurach (DE)

(72) Inventors: Thomas Riedel, Erlangen (DE); Robert Schieck, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 54 days.

(21) Appl. No.: 18/574,388

(22) PCT Filed: Aug. 1, 2022

(86) PCT No.: PCT/DE2022/100550
§ 371 (c)(1),
(2) Date: Dec. 27, 2023

(87) PCT Pub. No.: WO2023/051856
PCT Pub. Date: Apr. 6, 2023

(65) Prior Publication Data
US 2024/0308349 A1    Sep. 19, 2024

(30) Foreign Application Priority Data
Sep. 28, 2021   (DE) .......................... 102021125112.5

(51) Int. Cl.
*B60L 3/00*   (2019.01)
*B60L 15/20*   (2006.01)
(Continued)

(52) U.S. Cl.
CPC ............. *B60L 3/0061* (2013.01); *B60L 15/20* (2013.01); *H02K 7/116* (2013.01); *H02K 11/21* (2016.01);
(Continued)

(58) Field of Classification Search
CPC .. B60L 3/0061; B60L 15/20; B60L 2240/429; B60L 3/12; H02K 7/116;
(Continued)

(56) References Cited

U.S. PATENT DOCUMENTS

2018/0244257 A1* 8/2018 Kneitz ................. B60W 10/06
2019/0176803 A1* 6/2019 Tabatowski-Bush ... B60L 58/22
2021/0010581 A1   1/2021 Fukuda

FOREIGN PATENT DOCUMENTS

DE    102007010281 B3   10/2008
DE    102010048837 A1   4/2012
(Continued)

*Primary Examiner* — Michael C Zarroli
(74) *Attorney, Agent, or Firm* — Volpe Koenig

(57) ABSTRACT

The disclosure relates to an electric axle drive train of a motor vehicle. The drive train includes an electric machine having a rotor which is mounted rotatably relative to a stator and can be supplied with current by a control unit, a gear assembly which is coupled to the rotor and a first rotatably mounted output shaft which is operatively connected to the gear assembly in a torque-transmitting manner. The output shaft is connected in a torque-transmitting manner to a vehicle wheel of the motor vehicle. An actuatable rotation blocking device is positioned between the rotor and the vehicle wheel in such a way that a rotation of shafts lying in a torque flux can be blocked. At least one rotational angle sensor is positioned between the rotor and the rotation blocking device in such a way that it provides a signal, that represents a rotational angle position, to a shaft lying in said torque flux.

19 Claims, 1 Drawing Sheet

(51) Int. Cl.
*H02K 7/116* (2006.01)
*H02K 11/21* (2016.01)
*H02K 24/00* (2006.01)

(52) U.S. Cl.
CPC ........ *H02K 24/00* (2013.01); *B60L 2240/429* (2013.01)

(58) Field of Classification Search
CPC .. H02K 11/21; H02K 24/00; F16H 2057/016; F16H 57/01
See application file for complete search history.

(56) References Cited

FOREIGN PATENT DOCUMENTS

| | | |
|---|---|---|
| DE | 102011119466 A1 | 5/2013 |
| DE | 112019001422 T5 | 12/2020 |
| EP | 2498076 A1 | 9/2012 |
| EP | 3734117 A1 | 11/2020 |

* cited by examiner

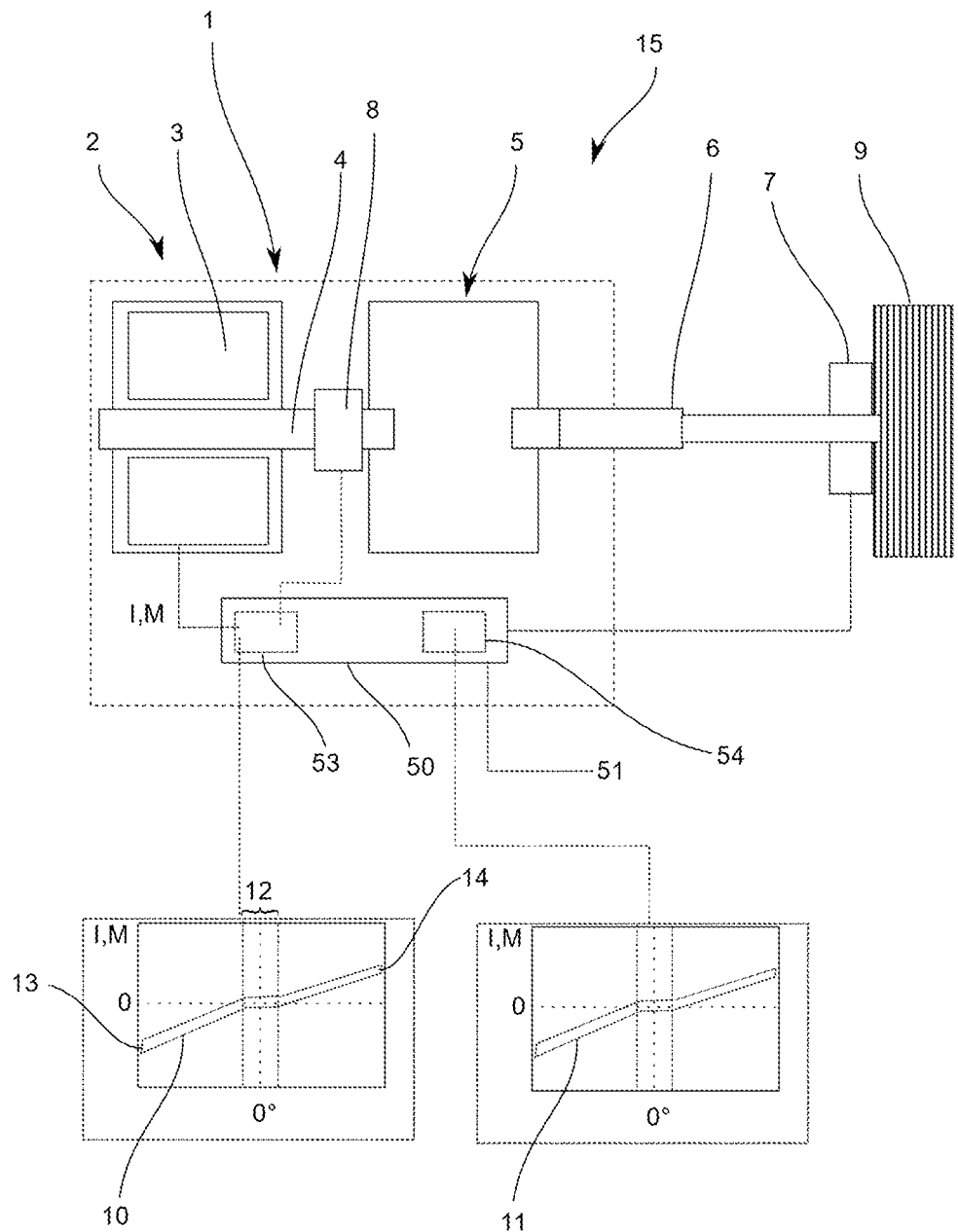

ELECTRIC AXLE DRIVE TRAIN, CONTROL UNIT, AND COMPUTER PROGRAMME PRODUCT

CROSS-REFERENCE TO RELATED APPLICATIONS

This application is the U.S. National Phase of PCT Appln. No. PCT/DE2022/100550, filed Aug. 1, 2022, which claims the benefit of German Patent Appln. No. 102021125112.5, filed Sep. 28, 2021, the entire disclosures of which are incorporated by reference herein.

TECHNICAL FIELD

The present disclosure relates to an electric axle drive train of a motor vehicle. The disclosure also relates to a control unit and a computer program product.

BACKGROUND

Electric motors are increasingly being used to drive motor vehicles in order to create alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in ATZ magazine, volume 113, 05/2011, pages 360-365 by Erik Schneider, Frank Fickl, Bernd Cebulski and Jens Liebold with the title: "Hochintegrativ und Flexibel Elektrische Antriebseinheit für E-Fahrzeuge" (Highly integrative and flexible electric drive unit for e-vehicles), which is probably the closest prior art. This article describes a drive unit for an axle of a vehicle, which comprises an electric motor that is arranged to be concentric and coaxial with respect to a bevel gear differential, wherein a switchable 2-speed planetary gear set is arranged in the drive train between the electric motor and the bevel gear differential, which is also positioned to be coaxial with respect to the electric motor or the bevel gear differential or spur gear differential. The drive unit is very compact and allows a good compromise between climbing ability, acceleration and energy consumption due to the switchable 2-speed planetary gear set. Such drive units are also referred to as e-axles or electrically operable drive trains.

DE 10 2010 048 837 A1 discloses such a drive device having at least one electric motor and at least one planetary differential that can be driven by a rotor of the electric motor, the planetary differential having at least one planetary carrier that is operatively connected to a rotor of the electric motor, first planetary gears and second planetary gears, which are rotatably mounted on the planetary carrier, and a first sun gear and a second sun gear, each of which is operatively connected to an output shaft of the planetary differential. The first planetary gears mesh with the first sun gear and each of the second planetary gears meshes with the second sun gear and with one of the first planetary gears. Furthermore, the sun gears are arranged coaxially with an axis of rotation of the rotor.

As in conventional drive concepts with an internal combustion engine, an electrically operable axle drive train is also subject to mechanical and/or electrical wear. There is a continuing need to determine and evaluate vehicle-specific wear scenarios when the motor vehicle is in operation.

SUMMARY

It is therefore the object of the present disclosure to provide an electric axle drive train that enables vehicle-specific wear scenarios to be determined and evaluated during operation of the motor vehicle.

This object is achieved by an electric axle drive train of a motor vehicle comprising an electric machine with a rotor which is rotatably mounted relative to a stator and which can be supplied with current by a control unit, and a gear assembly coupled to the rotor and a first, rotatably mounted output shaft operatively connected in a torque-transmitting manner to the gear assembly, wherein the output shaft is connected to a vehicle wheel of the motor vehicle in a torque-transmitting manner, wherein an actuatable rotation blocking device is arranged between the rotor and the vehicle wheel in such a way that rotation of the shafts located in the torque flux can be blocked, wherein also at least one rotational angle sensor is arranged between the rotor and the rotation blocking device in such a way that it provides a signal, representing the rotational angle position, of a shaft located in this torque flux, wherein the control unit is configured to determine mechanical wear of the rotatable components located in the torque flux between the rotor and the rotation blocking device in that the rotation blocking device blocks rotation of the shafts located in the torque flux between the rotor and the rotation blocking device, and then the electric machine is supplied with a current strength that increases up to a predefined first current strength threshold value so that an increasing torque acting in a first direction of rotation is applied to the rotor, and then the electric machine is supplied with a current strength that increases up to a predefined second current strength threshold value so that an increasing torque acting in a second direction of rotation is applied to the rotor, wherein in the control unit, while the electric machine is supplied with current, the current strength and its temporally associated signals, representing a rotational angle position, of the rotational angle sensor are captured and the corresponding current strength and rotational angle position values are correlated to form an actual wear characteristic curve, and this is compared with a target wear characteristic curve stored in the control unit, wherein, in the case of a deviation between the actual wear characteristic curve and the target wear characteristic curve, an output signal representing the deviation is generated by the control unit.

As a result, an axle drive train can be provided which, during operation, can determine the wear of mechanical components and components that transmit traction torque and, for example, indicates a deviation from a predicted wear scenario to the driver or operator of the motor vehicle. The axle drive train according to the disclosure, as service life increases, will also have steadily increasing wear and thus play associated therewith, which is also known as backlash in the drive train.

For example, the axle drive train according to the disclosure can first be put in an operating state in which a rotation blocking device, such as a wheel brake or parking brake of the drive train, is transferred to its blocking position. The electric machine is then controlled, for example, in such a way that a defined load is set via a torque build-up of the electric machine, first forwards and then backwards. After this, the angle of rotation of the rotor of the electric machine can then be analyzed, for example using a standard resolver in PSM machines. In principle, it would of course also be possible to provide a separate rotational angle sensor for the rotor or the rotor shaft of the electric machine. The signals of the rotational angle sensor that represent a rotational angle position are captured in the control unit, and the corresponding current strength and rotational angle position values are correlated to form an actual wear characteristic curve. This actual wear characteristic curve is then compared with a target wear characteristic curve stored in the control unit, with the control unit generating an output signal representing the deviation if the actual wear characteristic curve deviates from the target wear characteristic curve.

The correlation of the actual wear characteristic curve requires at least two current strength and rotational angle position values. From these, a function can then be derived by interpolation, which defines the actual wear characteristic curve. In addition or as an alternative, it is possible for a large number of discrete current strength values and rotational angle position values to be determined and used as interpolation points for an actual wear characteristic curve.

First, the individual elements of the claimed subject matter of the disclosure are explained in the order in which they are mentioned in the claims, and particularly preferred embodiments of the subject matter of the disclosure are described below.

An electric axle drive train, in particular of a motor vehicle, comprises at least one electric machine and one gear assembly, wherein the electric machine and the gear assembly form a structural unit. It is also possible in particular for an electric machine and a gear assembly to be arranged in a common drive train housing. Alternatively, it would of course also be possible for the electric machine to have a motor housing and the transmission to have a transmission housing, in which case the structural unit can then be realized by fixing the gear assembly in relation to the electric machine. This structural unit is sometimes also referred to as an e-axle.

In connection with the disclosure, the electric machine can be designed as a radial or axial flux machine. In order to form an axially particularly compact axle drive train, preference should be given to axial flow machines. The electric machine is intended in particular for use within an electrically operable drive train of a motor vehicle.

In particular, the electric machine is dimensioned such that vehicle speeds of more than 50 km/h, preferably more than 80 km/h and in particular more than 100 km/h can be achieved. The electric motor particularly preferably has an output of more than 30 KW, preferably more than 50 KW and in particular more than 70 KW. Furthermore, it is preferred that the electric machine provides speeds greater than 5000 rpm, particularly preferably greater than 10,000 rpm, very particularly preferably greater than 12,500 rpm.

The gear assembly of the electric axle drive train can, in particular, be coupled to the electric machine, which is designed to generate a drive torque for the motor vehicle. The drive torque is particularly preferably a main drive torque so that the motor vehicle is driven exclusively by the drive torque.

The axle drive train according to the disclosure can have a control unit. A control unit, as used in the present disclosure, is used in particular for the electronic open-loop control and/or closed-loop control of one or more technical systems of the motor vehicle. In particular, a control unit for the open-loop control and/or closed-loop control of the electric machine can be provided.

A control unit in particular has a wired or wireless signal input for receiving electrical signals, in particular, such as sensor signals. Furthermore, a control unit likewise preferably has a wired or wireless signal output for the transmission of, in particular, electrical signals, for example to electrical actuators or electrical consumers of the motor vehicle.

Open-loop control operations and/or closed-loop control operations can be carried out within the control unit. It is very particularly preferred that the control unit comprises hardware that is designed to execute software. The control unit preferably comprises at least one electronic processor for executing program sequences defined in a software.

The control unit can also have one or more electronic memories in which the data contained in the signals transmitted to the control unit can be stored and read out again. Furthermore, the control unit can have one or more electronic memories in which data can be stored in a changeable and/or unchangeable manner.

A control unit can comprise a plurality of controllers which are arranged in particular spatially separate from one another in the motor vehicle. Controllers are also referred to as electronic control units (ECU) or electronic control modules (ECM) and preferably have electronic microcontrollers for carrying out computing operations for processing data, particularly preferably using software. The controllers can preferably be networked with one another so that a wired and/or wireless data exchange between control devices is made possible. In particular, it is also possible to network the controllers with one another via bus systems present in the motor vehicle, such as a CAN bus or LIN bus.

The control unit can particularly preferably include a power electronics unit for supplying the stator or rotor with current. The power electronics unit is preferably a combination of different components that control a current to the electric machine in an open-loop or closed-loop manner, preferably including the peripheral components required for this purpose, such as cooling elements or power supply units. In particular, the power electronics unit contains one or more power electronics components that are configured to control a current in an open-loop or closed loop manner. This involves particularly preferably one or more power switches, such as power transistors. The power electronics unit particularly preferably has more than two, particularly preferably three, phases or current paths which are separate from one another and each have at least one separate power electronics component. The power electronics unit is preferably designed to control a power per phase in an open-loop or closed-loop manner with a peak power, preferably continuous power, of at least 10 W, preferably at least 100 W, particularly preferably at least 1000 W.

According to an advantageous embodiment of the disclosure, it is possible for a deviation between the actual wear characteristic curve and the target wear characteristic curve to be detected within a rotational angle position interval stored in the control unit. In this context, according to a further preferred further development of the disclosure, the rotational angle position interval can contain a rotational angle zero point. The result of this can be that particularly accurate and reliable wear measurement or service life prediction can be realized.

Furthermore, according to a likewise advantageous embodiment of the disclosure, it is possible for the output signal representing the deviation to contain information about the degree of deviation, the position and/or magnitude of the deviation in the wear characteristic curves. The advantageous effect of this embodiment is based on the fact that more extensive analysis of the wear or damage scenario can be performed from this.

According to a further particularly preferred embodiment of the disclosure, the rotation blocking device is a braking device, in particular a wheel brake. This can in particular achieve the effect that components often already present in a drive train can be used in order to enable wear analysis.

Furthermore, the disclosure can also be further developed such that the rotational angle sensor is an absolute rotational angle sensor. In a likewise preferred embodiment of the disclosure, it is possible for the rotational angle sensor to be a resolver of a permanently excited synchronous machine. It can also be advantageous to further develop the disclosure in such a way that the rotational angle sensor determines the rotational angle position of the rotor.

The object of the disclosure is also achieved by a control unit for an electric axle drive train of a motor vehicle, having a processor and a memory, the control unit being configured to determine mechanical wear of the rotatable components located in the torque flux between a rotor of an electric machine and a rotation blocking device by the control unit generating a control signal which causes the rotation blocking device to be actuated so that the rotation blocking device blocks the rotation of the shafts located in the torque flux between the rotor and the rotation blocking device, and then the electrical control unit supplies the electric machine with a current strength that increases up to a predefined first current strength threshold value so that an increasing torque acting in a first direction of rotation is applied to the rotor, and then the control unit supplies the electric machine with a current strength that increases up to a predefined second current strength threshold value so that an increasing torque acting in a second direction of rotation is applied to the rotor, wherein in the control unit, while the electric machine is supplied with current, the current strength and its temporally associated signals, representing a rotational angle position, of a rotational angle sensor are captured, said rotational angle sensor positioned between the rotor and the rotation blocking device, and the corresponding current strength and rotational angle position values are correlated to form an actual wear characteristic curve, and this is compared with a target wear characteristic curve stored in the control unit, wherein, in the case of a deviation between the actual wear characteristic curve and the target wear characteristic curve, an output signal representing the deviation is generated by the control unit.

Finally, the object of the disclosure can also be achieved by a computer program product which is stored on a machine-readable carrier, or a computer data signal, embodied by an electromagnetic wave, with a computer program code, which is suitable for carrying out a method comprising the following steps:

generating a control signal which causes a rotation blocking device to be actuated so that the rotation blocking device blocks the rotation of shafts located in the torque flux between a rotor and the rotation blocking device, supplying the electric machine with a current strength which increases up to a predefined first current strength threshold value so that an increasing torque acting in a first direction of rotation is applied to the rotor, supplying the electric machine with a current strength which increases up to a predefined second current strength threshold value so that an increasing torque acting in a second direction of rotation is applied to the rotor, capturing the current strength and its temporally associated signals, representing a rotational angle position, of a rotational angle sensor, which is positioned between the rotor and the rotation blocking device, while the electric machine is supplied with current, correlating the corresponding current strength and rotational angle position values to form an actual wear characteristic curve, and comparing said actual wear characteristic curve with a target wear characteristic curve stored in the control unit, wherein, in the case of a deviation of the actual wear characteristic curve from the target wear characteristic curve, an output signal representing the deviation is generated.

BRIEF DESCRIPTION OF THE DRAWINGS

The disclosure will be explained in more detail below with reference to drawings without limiting the general concept of the disclosure.

In the drawings:

FIG. 1 shows an electric axle drive train in a schematic block diagram.

DETAILED DESCRIPTION

FIG. 1 shows an electric axle drive train 1 of a motor vehicle 15 comprising an electric machine 2 with a rotor 4 which is rotatably mounted relative to a stator 3 and which can be supplied with current by a control unit 50. The axle drive train also has a gear assembly 5 coupled to the rotor 4 and a first, rotatably mounted output shaft 6 operatively connected to the gear assembly 5 in a torque-transmitting manner.

The output shaft 6 is in turn connected to a vehicle wheel 9 of the motor vehicle 15 in a torque-transmitting manner. An actuatable rotation blocking device 7 is arranged between the rotor 4 and the vehicle wheel 9 in such a way that rotation of the shafts located in the torque flux can be blocked. In the exemplary embodiment shown, the rotation blocking device 7 is a braking device, in particular a wheel brake, which is arranged on or in the vehicle wheel 9.

At least one rotational angle sensor 8 is also arranged between the rotor 4 and the rotation blocking device 7 in such a way that it provides a signal, representing the rotational angle position, of a shaft located in this torque flux.

The rotational angle sensor 8 is preferably an absolute rotational angle sensor. In particular, the rotational angle sensor 8 can also be a resolver of an electric machine 2 configured as a permanently excited synchronous machine. The rotational angle sensor 8 determines the rotational angle position of the rotor 4.

The control unit 50 is configured to determine mechanical wear of the rotatable components located in the torque flux between the rotor 4 and the rotation blocking device 7 in that the rotation blocking device 7 blocks the rotation of the shafts located in the torque flux between the rotor 4 and the rotation blocking device 7, and subsequently the electric machine 2 is supplied with a current strength that increases up to a predefined first current strength threshold value 13 so that an increasing torque acting in a first direction of rotation is applied to the rotor 4. The electric machine 2 is then supplied with a current strength that increases up to a predefined second current strength threshold value 14 so that an increasing torque acting in a second direction of rotation is applied to the rotor 4.

The first current strength threshold value 13 and the second current strength threshold value 14 each represent the current strength corresponding to the maximum rated power of the electric machine 2.

In the control unit 50, while the electric machine 2 is supplied with current, the current strength and its temporally associated signals of the rotational angle sensor 8, which represent a rotational angle position, are captured and the corresponding current strength and rotational angle position values are correlated to form an actual wear characteristic curve 10.

This is then compared with a target wear characteristic curve 11 stored in the control unit 50, wherein, in the case of a deviation of the actual wear characteristic curve 10 from the target wear characteristic curve 11, an output signal 51 representing the deviation is generated by the control unit 50. A deviation between the actual wear characteristic curve 10 and the target wear characteristic curve 11 is detected within a rotational angle position interval 12 stored in the control unit 50, wherein the rotational angle position interval 12 contains a rotational angle zero point.

The output signal 51 representing the deviation can also contain information about the degree of deviation, the position and/or magnitude of the deviation in the wear characteristic curves 10, 11.

The control unit 50 has a processor 53 and a memory 54 and is configured to determine mechanical wear of the rotatable components located in the torque flux between the rotor 4 of the electrical machine 2 and the rotation blocking device 7. For this purpose, the control unit 50 generates a control signal which causes rotation blocking device 7 to be actuated so that rotation blocking device 7 blocks the rotation of the shafts located in the torque flux between rotor 4 and rotation blocking device 7.

Subsequently, the control unit 50 supplies the electric machine 2 with a current strength that increases up to a predefined first current strength threshold value so that an increasing torque acting in a first direction of rotation is applied to the rotor 4, and then the control unit 50 supplies the electric machine 2 with a current strength that increases up to a predefined second current strength threshold value so that an increasing torque acting in a second direction of rotation is applied to the rotor 4, While the electric machine 2 is supplied with current, the control unit 50 captures the current strength and its temporally associated signals, representing a rotational angle position, of the rotational angle sensor 8, which is positioned between the rotor 4 and the rotation blocking device 7. The corresponding current strength and rotational angle position values are then correlated to form an actual wear characteristic curve 10, and this is compared with a target wear characteristic curve 11 stored in the control unit 50. If the actual wear characteristic curve 10 deviates from the target wear characteristic curve 11, the control unit 50 generates an output signal 51 representing the deviation.

The memory 54 of the control unit 50 has a computer program code that is suitable for carrying out a method comprising the following steps.

Firstly, a control signal is generated which causes a rotation blocking device 7 to be actuated so that the rotation blocking device 7 blocks the rotation of shafts located in the torque flux between a rotor 4 and the rotation blocking device 7.

Then the electric machine 2 is supplied with a current strength which increases up to a predefined first current strength threshold value so that an increasing torque acting in a first direction of rotation is applied to the rotor 4.

After that, the electric machine 2 is supplied with a current strength which increases up to a predefined second current strength threshold value so that an increasing torque acting in a second direction of rotation is applied to the rotor 4.

This is followed by a capture of the current strength and its temporally associated signals, representing a rotational angle position, of a rotational angle sensor 8, which is positioned between the rotor 4 and the rotation blocking device 7, while the electric machine 2 is supplied with current.

Finally, the corresponding current strength and rotational angle position values are correlated to form an actual wear characteristic curve 10, and this is compared with a target wear characteristic curve 11 stored in the control unit 50, wherein, in the case of a deviation of the actual wear characteristic curve 10 from the target wear characteristic curve 11, an output signal 51 representing the deviation is generated.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SIGNS

1 Axle drive train
2 Electric machine
3 Stator
4 Rotor
5 Gear assembly
6 Output shaft
7 Rotation blocking device
8 Rotational angle sensor
9 Vehicle wheel
10 Actual wear characteristic curve
11 Target wear characteristic curve
12 Rotational angle position interval
13 Current strength threshold value
14 Current strength threshold value
15 Motor vehicle
50 Control unit
51 Output signal
53 Processor
54 Memory

The invention claimed is:

1. An electric axle drive train of a motor vehicle comprising:
   an electric machine with a rotor which is rotatably mounted relative to a stator and which can be supplied with current by a control unit, and
   a gear assembly which is coupled to the rotor and a first, rotatably mounted output shaft which is operatively connected to the gear assembly in a torque-transmitting manner,
   wherein the output shaft is connected in a torque-transmitting manner to a vehicle wheel of the motor vehicle,
   wherein an actuatable rotation blocking device is arranged in a torque flux between the rotor and the vehicle wheel in such a way that rotation of at least one shaft located in the torque flux can be blocked,
   wherein at least one rotational angle sensor is arranged between the rotor and the rotation blocking device in such a manner that it provides a signal, representing the rotational angle position, of the at least one of the shaft located in said torque flux,
   wherein the control unit is configured to determine mechanical wear of rotatable components located in the torque flux between the rotor and the rotation blocking device in that the rotation blocking device blocks rotation of the at least one shaft located in the torque flux between the rotor and the rotation blocking device, and then the electric machine is supplied with a current strength that increases up to a predefined first current strength threshold value so that an increasing torque acting in a first direction of rotation is applied to the rotor, and then the electric machine is supplied with a current strength increasing up to a predefined second current strength threshold value so that an increasing torque acting in a second direction of rotation is applied to the rotor, wherein in the control unit, while the electric machine is supplied with current, a current strength and its temporally associated signals, representing a rotational angle position, of the rotational angle sensor are captured and correlated to form an actual wear characteristic curve, and the actual wear characteristic curve is compared with a target wear characteristic curve stored in the control unit, wherein if the actual wear characteristic curve deviates from the target wear characteristic curve, the control unit generates an output signal representing the deviation.

2. The axle drive train according to claim 1, wherein a deviation between the actual wear characteristic curve and the target wear characteristic curve is detected within a rotational angle position interval stored in the control unit.

3. The axle drive train according to claim 2, wherein, the rotational angle position interval contains a rotational angle zero point.

4. The axle drive train according to any one of the claim 1, wherein the output signal representing the deviation contains information about at least one of a degree of deviation, a position or magnitude of the deviation in the wear characteristic curves.

5. The axle drive train according to claim 1, wherein the rotation blocking device includes a braking device.

6. The axle drive train according to claim 1, wherein the rotational angle sensor includes an absolute rotational angle sensor.

7. The axle drive train according to claim 1, wherein the rotational angle sensor includes a resolver of a permanently excited synchronous machine.

8. The axle drive train according to any one of the claim 1, wherein the rotational angle sensor determines a rotational angle position of the rotor.

9. The axle drive train according to claim 1, wherein the first current strength threshold value and the second current threshold value each represent the current strength corresponding to a maximum rated power of the electric machine.

10. A control unit for an electric axle drive train of a motor vehicle, comprising: a processor and a memory, wherein the control unit is configured to determine mechanical wear of rotatable components located in a torque flux between a rotor of an electric machine and a rotation blocking device in that the control unit generates a control signal which causes the rotation blocking device to be actuated so that the rotation blocking device blocks rotation of at least one shaft located in the torque flux between the rotor and the rotation blocking device, and then the electrical control unit supplies the electric machine with a current strength that increases up to a predefined first current strength threshold value so that an increasing torque acting in a first direction of rotation is applied to the rotor, and then the control unit supplies the electric machine with a current strength that increases up to a predefined second current strength threshold value so that an increasing torque acting in a second direction of rotation is applied to the rotor, wherein, in the control unit, while the electric machine is supplied with current, a current strength and its temporally associated signals, representing a rotational angle position, of a rotational angle sensor are captured and correlated to form an actual wear characteristic curve, which rotational angle sensor is positioned between the rotor and the rotation blocking device, and the actual wear characteristic curve is compared with a target wear characteristic curve stored in the control unit, wherein, in the case of a deviation between the actual wear characteristic curve and the target wear characteristic curve, an output signal representing the deviation is generated by the control unit.

11. The control unit according to claim 10, wherein a deviation between the actual wear characteristic curve and the target wear characteristic curve is detected within a rotational angle position interval stored in the control unit.

12. The control unit according to claim 11, wherein, the rotational angle position interval contains a rotational angle zero point.

13. The control unit according to claim 10, wherein the output signal representing the deviation contains information about at least one of a degree of deviation, a position or magnitude of the deviation in the wear characteristic curves.

14. The control unit according to claim 10, wherein the rotation blocking device includes a braking device.

15. The control unit according to claim 10, wherein the rotational angle sensor includes an absolute rotational angle sensor.

16. The control unit according to claim 10, wherein the rotational angle sensor includes a resolver of a permanently excited synchronous machine.

17. The control unit according to claim 10, wherein the rotational angle sensor determines a rotational angle position of the rotor.

18. The control unit according to claim 10, wherein the first current strength threshold value and the second current threshold value each represent the current strength corresponding to a maximum rated power of the electric machine.

19. A computer program stored on a machine-readable carrier for:

generating a control signal which causes a rotation blocking device of an electric machine to be actuated so that the rotation blocking device blocks rotation of at least one shaft located in a torque flux between a rotor of the electric machine and the rotation blocking device, supplying the electric machine with a current strength which increases up to a predefined first current strength threshold value so that an increasing torque acting in a first direction of rotation is applied to the rotor, supplying the electric machine with a current strength which increases up to a predefined second current strength threshold value so that an increasing torque acting in a second direction of rotation is applied to the rotor, capturing a current strength and its temporally associated signals, representing a rotational angle position, of a rotational angle sensor, which is positioned between the rotor and the rotation blocking device, while the electric machine is supplied with current, correlating at least one of the captured current strength and rotational angle position to form an actual wear characteristic curve, and comparing said actual wear characteristic curve with a target wear characteristic curve stored in the control unit, wherein, in the case of a deviation of the actual wear characteristic curve from the target wear characteristic curve, an output signal representing the deviation is generated.

\* \* \* \* \*